(12) United States Patent
Vollmers et al.

(10) Patent No.: US 8,646,249 B1
(45) Date of Patent: Feb. 11, 2014

(54) MOISTENER COLUMN DOOR COMPRESSION STRUCTURE FOR COTTON HARVESTER ROW UNIT

(75) Inventors: Mark B. Vollmers, W Des Moines, IA (US); Joel M. Schreiner, Ankeny, IA (US); Marcus A. Jacobson, Ames, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 13/600,938

(22) Filed: Aug. 31, 2012

(51) Int. Cl.
*A01D 46/16* (2006.01)

(52) U.S. Cl.
USPC .............................................. 56/41

(58) Field of Classification Search
USPC ............. 56/41, 50, 28, 36, 40, 42, 43, 44, 45, 56/46, 47, 32
See application file for complete search history.

(56) References Cited

U.S. PATENT DOCUMENTS

| | | | | |
|---|---|---|---|---|
| 2,433,083 | A | * | 12/1947 | Baker et al. .................. 56/41 |
| 2,845,767 | A | * | 8/1958 | Crawford ...................... 56/41 |
| 3,004,376 | A | * | 10/1961 | Hubbard ....................... 56/41 |
| 3,028,718 | A | * | 4/1962 | Hubbard ....................... 56/41 |
| 3,224,178 | A | * | 12/1965 | Kennedy ...................... 56/41 |
| 3,354,625 | A | * | 11/1967 | Taylor et al. ................. 56/44 |
| 3,505,799 | A | * | 4/1970 | Fergason ...................... 56/41 |
| 3,546,862 | A | * | 12/1970 | Fergason ...................... 56/41 |
| 4,249,365 | A | | 2/1981 | Hubbard et al. |
| 4,461,140 | A | * | 7/1984 | Carmi et al. ................. 56/50 |
| 4,821,497 | A | * | 4/1989 | Deutsch et al. .............. 56/41 |
| 4,821,498 | A | * | 4/1989 | Deutsch et al. .............. 56/50 |
| 4,850,184 | A | | 7/1989 | Deutsch et al. |
| 4,905,464 | A | * | 3/1990 | Thedford ..................... 56/50 |
| 5,247,786 | A | * | 9/1993 | Schreiner ..................... 56/41 |
| 5,355,663 | A | * | 10/1994 | Deutsch et al. ............ 56/12.1 |
| 5,471,826 | A | | 12/1995 | Schreiner |
| 5,557,910 | A | | 9/1996 | Del Rosario |
| 5,722,224 | A | * | 3/1998 | Sheldon et al. ............... 56/41 |
| 6,530,201 | B2 | | 3/2003 | Snyder et al. |
| 6,536,198 | B1 | * | 3/2003 | Thedford et al. ............. 56/41 |
| 6,640,529 | B2 | | 11/2003 | Lemke et al. |
| 7,360,280 | B2 | | 4/2008 | Fox et al. |
| 7,631,716 | B2 | | 12/2009 | Fox et al. |
| 8,006,472 | B1 | | 8/2011 | Schreiner et al. |

* cited by examiner

*Primary Examiner* — Árpád Fábián-Kovács

(57) ABSTRACT

A row unit for a cotton harvester. The cotton harvester is adapted for forward movement through a field to harvest cotton planted in rows in the field. The row unit includes a unit housing defining a row receiving area and a cotton exiting area. A moistener column door is pivotally coupled to the unit housing. An adjustable compression structure is coupled to the unit housing and configured to exert an adjustable pre-load on the moistener column door, placing the moistener column door in a closed position. The adjustable compression structure is configured to yield to a cotton plug pressure that exceeds the adjustable pre-load, which pivots the moistener column door to an open position. When the adjustable pre-load exceeds the cotton plug pressure, the adjustable compression structure is configured to return the moistener column door to the closed position.

17 Claims, 7 Drawing Sheets

MOISTENER COLUMN DOOR COMPRESSION STRUCTURE FOR COTTON HARVESTER ROW UNIT

FIELD OF THE DISCLOSURE

The present disclosure generally relates to cotton harvesters and more particularly to moistener column door compression structures for row units of cotton harvesters.

BACKGROUND OF THE DISCLOSURE

In order to harvest cotton, cotton harvesters commonly include a plurality of row units. Each row unit typically includes a unit housing that rotatably supports a pair of upright drums having a plurality of spindle bars. The spindle bars rotatably support spindles with barbs for picking cotton from cotton boils. Spindles that are wrapped with cotton pass under rotating doffer disks of an upright doffer column, which unwind the cotton and push the cotton off of the spindles. The spindles pass under moistener pads of an upright moistener column, which clean remaining debris from the spindles using water and a liquid cleaner dispensed by the moistener pads.

The upright moistener column includes a column frame supporting a plurality of moistener pad support arms. The moistener pad support arms project toward the spindles and support the moistener pads. The upright moistener column is coupled to a moistener column door, which is pivotally mounted to the unit housing.

A rod having bent ends is mounted to the moistener column door. The bent ends facilitate twisting the rod when the moistener column door is dosed, which creates a non-adjustable pre-load between the rod and a set of bushings mounted to the unit housing. The pre-load holds the moistener column door in a closed position. When a cotton plug occurs, cotton is carried by the spindles to the moistener pads. The cotton creates pressure on the moistener column door, which overcomes the pre-load and causes the moistener column door to pivot to an open position, which enables the cotton to pass.

SUMMARY OF THE DISCLOSURE

In one embodiment, a row unit for a cotton harvester is disclosed. The row unit includes a unit housing. The unit housing defines a row receiving area and a cotton exiting area. A moistener column door is pivotally coupled to the unit housing. A compression structure is coupled to the unit housing and configured to exert a pre-load on the moistener column door, placing the moistener column door in a closed position. The compression structure is configured to yield to a cotton plug pressure that exceeds the pre-load, which pivots the moistener column door to an open position. When the pre-load exceeds the cotton plug pressure, the compression structure is configured to return the moistener column door to the closed position.

In another embodiment, a row unit for a cotton harvester is disclosed. The row unit includes a unit housing. The unit housing defines a row receiving area and a cotton exiting area. A moistener column door is pivotally coupled to the unit housing. An adjustable compression structure is coupled to the unit housing and configured to exert an adjustable pre-load on the moistener column door, placing the moistener column door in a closed position. The adjustable compression structure is configured to yield to a cotton plug pressure that exceeds the adjustable pre-load, which pivots the moistener column door to an open position. When the adjustable pre-load exceeds the cotton plug pressure, the adjustable compression structure is configured to return the moistener column door to the closed position.

In yet another embodiment, a cotton harvester is disclosed. The cotton harvester includes a chassis. A row unit is coupleable to the chassis. The row unit has a unit housing. The unit housing defines a row receiving area and a cotton exiting area. A moistener column door is pivotally coupled to the unit housing. A compression structure is coupled to the unit housing and configured to exert a pre-load on the moistener column door, placing the moistener column door in a closed position. The compression structure is configured to yield to a cotton plug pressure that exceeds the pre-load, which pivots the moistener column door to an open position. When the pre-load exceeds the cotton plug pressure, the compression structure is configured to return the moistener column door to the closed position.

Other features and aspects will become apparent by consideration of the detailed description and accompanying drawings.

Before any embodiments are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Further embodiments of the invention may include any combination of features from one or more dependent claims, and such features may be incorporated, collectively or separately, into any independent claim.

DETAILED DESCRIPTION

Figure 1:
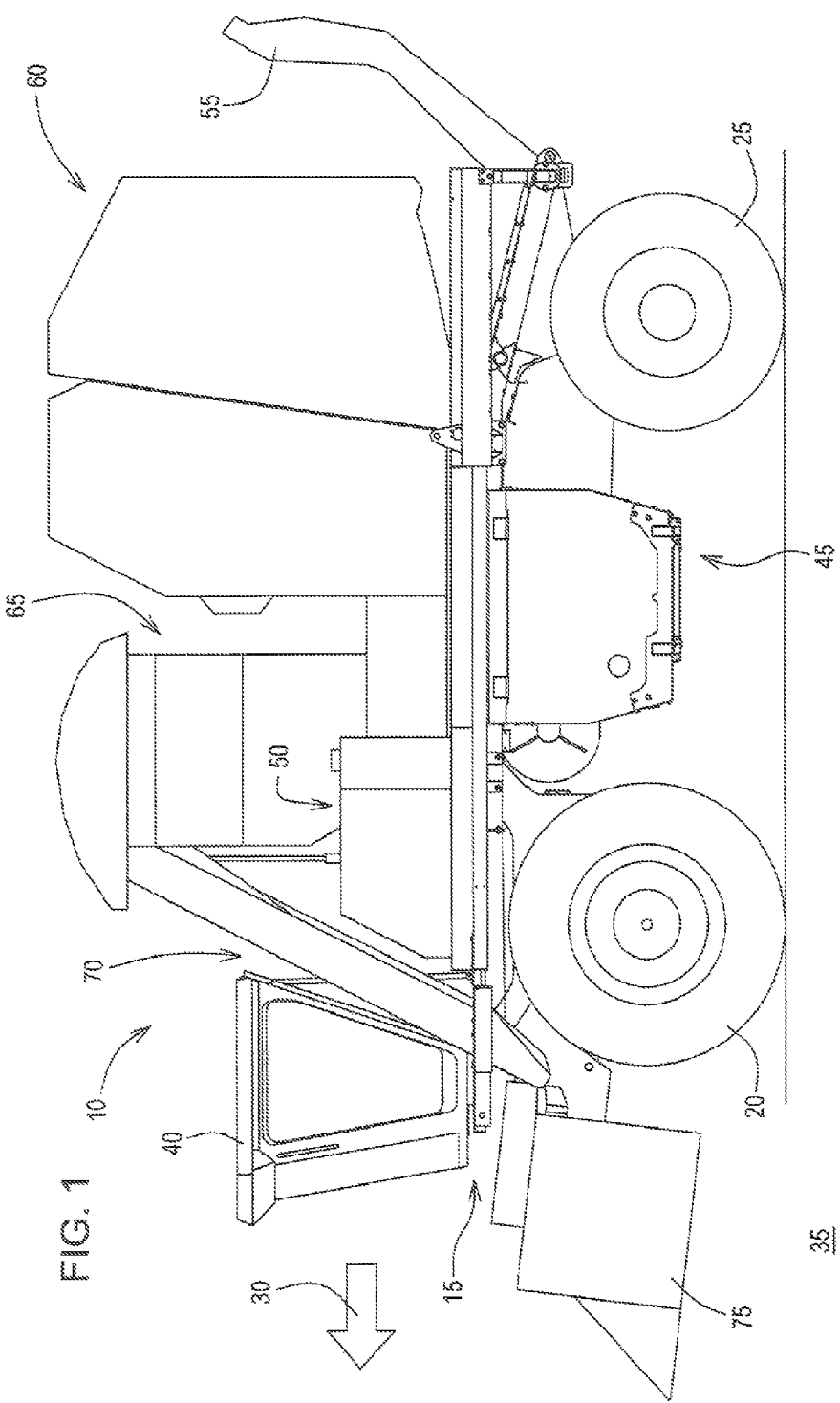
FIG. 1 is a side view of a cotton harvester including a row unit according to one embodiment.

FIG. 1 illustrates a cotton harvester 10 according to one embodiment. The illustrated cotton harvester 10 includes a chassis 15 supported by front wheels 20 and rear wheels 25. The cotton harvester 10 is adapted for movement in a forward direction 30 to harvest cotton (not shown) planted in a field 35. An operator station 40 is supported by the chassis 15. A power module 45 is supported below the chassis 15. Water, lubricant, and fuel tanks, indicated generally at 50, are supported on the chassis 15.

An unloading device 55 is coupled to the chassis 15 for receiving a cotton bale or module (not shown) released from a processor 60. The processor 60 is coupled to the chassis 15 for receiving cotton from a receiver 65. The receiver 65 is coupled to the chassis 15 for receiving cotton from an air duct system 70. The air duct system 70 is coupled to the receiver 65 and a row unit 75 to transfer cotton there between.

Figure 2:
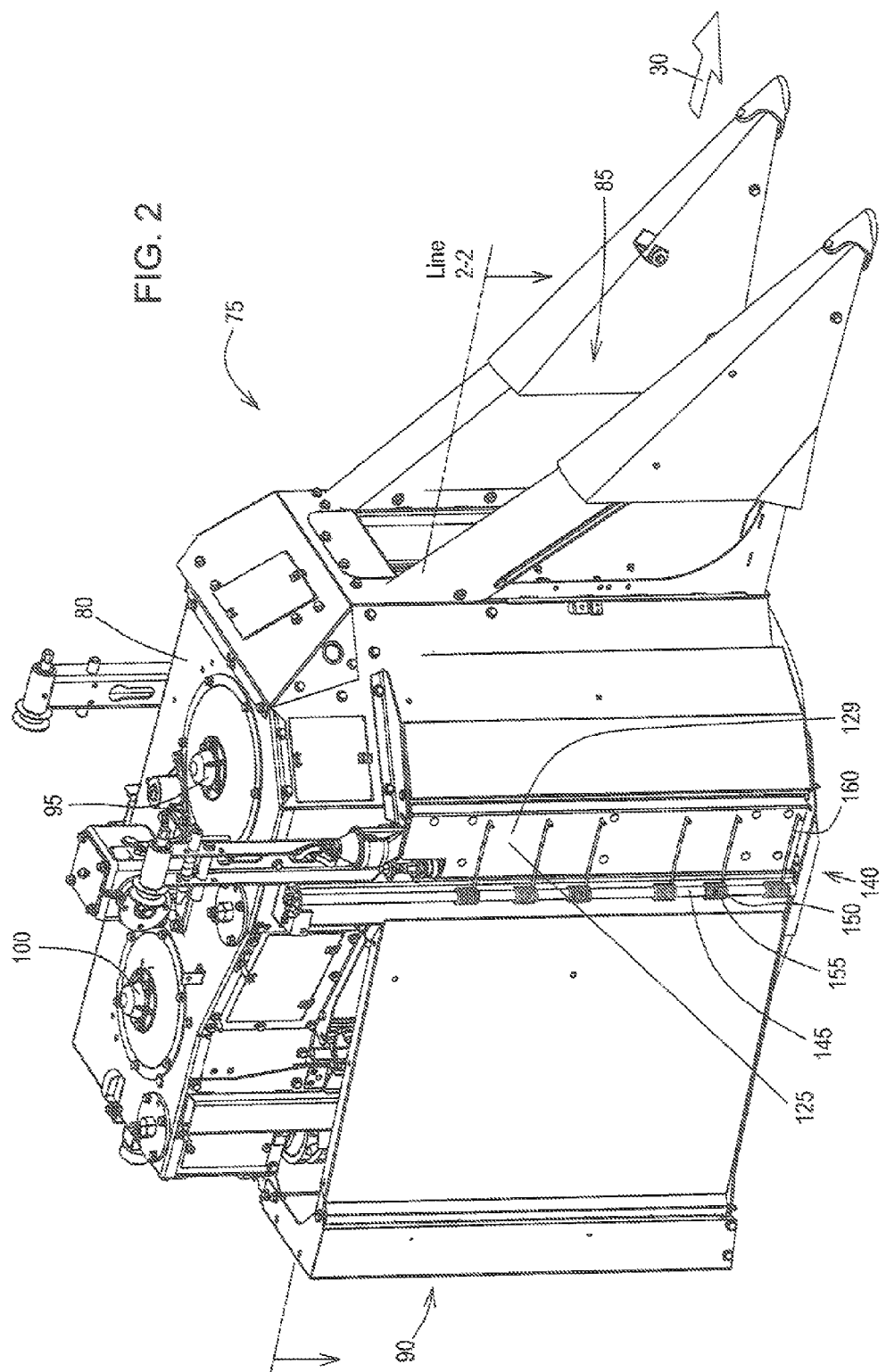
FIG. 2 is a perspective view of the row unit of FIG. 1.
Figure 3:
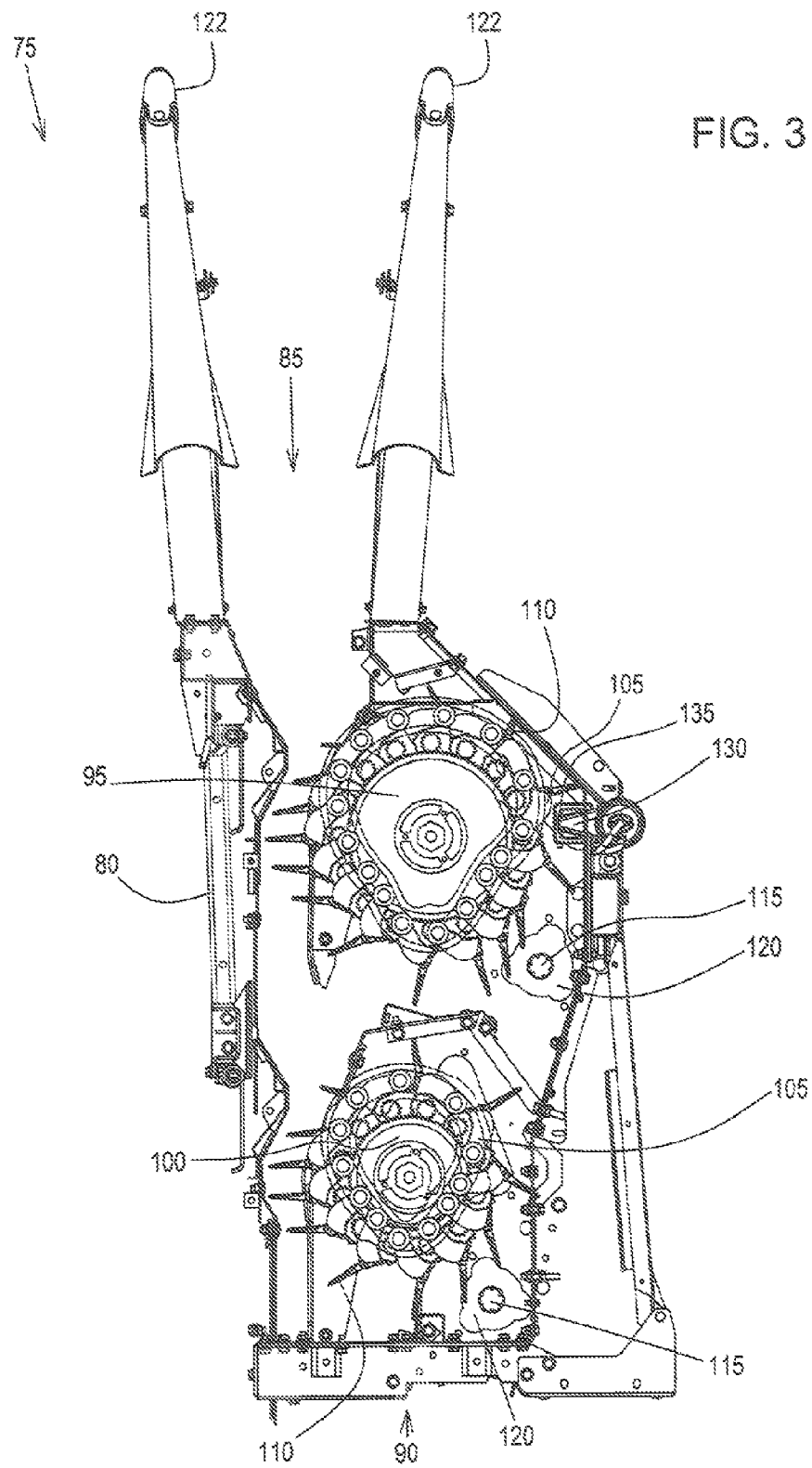
FIG. 3 is a sectioned view of the row unit taken generally along line 2-2 in FIG. 2, showing a moisture column door in a closed position.
Figure 4:
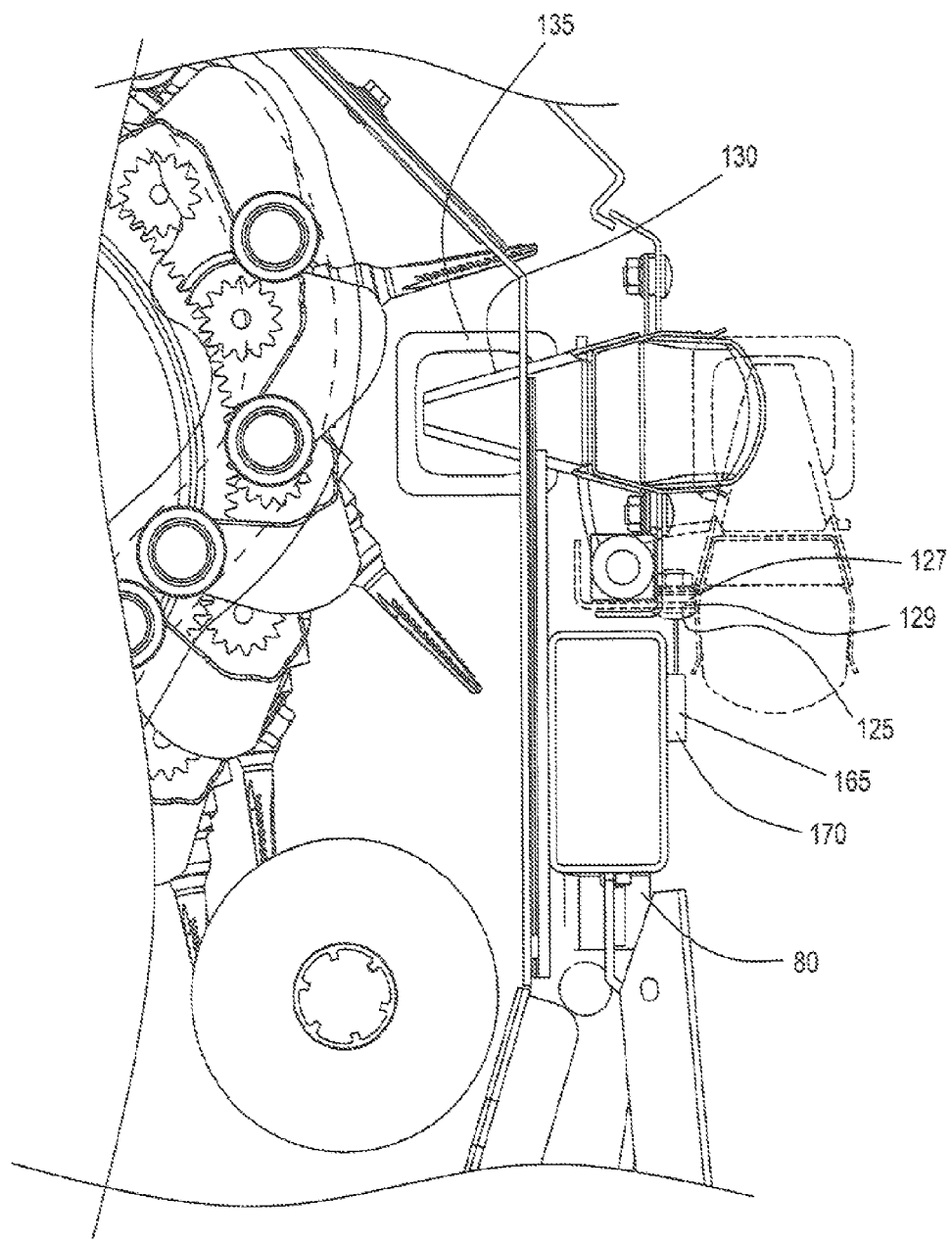
FIG. 4 is a partial view of the row unit of FIG. 3, showing the moisture column door.

Referring to FIGS. 2-4, the row unit 75 includes a unit housing 80 defining a row receiving area 85 and a cotton exiting area 90. An upright front drum 95 is rotatably supported by the unit housing 80 adjacent the row receiving area 85. An upright rear drum 100 is rotatably supported by the unit housing 80 rearwardly of the upright front drum 95.

With reference to FIG. 3, a plurality of spindle bars 105 are coupled for rotation with the upright front drum 95 and the upright rear drum 100. The spindle bars 105 rotatably support a plurality of spindles 110 configured to harvest cotton.

A plurality of upright doffer drums 115 are rotatably supported by the unit housing 80. The upright doffer drums 115 rotatably support a plurality of doffer disks 120 configured to remove the cotton from the spindles 110.

A pair of stalklifters 122 is coupled to the unit housing 80. The stalklifters 122 assist with positioning the cotton in the row receiving area 85.

Referring to FIG. 4, a moistener column door 125 is pivotally coupled to the unit housing 80. The moistener column door 125 includes an internal portion 127 and an external portion 129. An upright moistener column 130 is coupled to the internal portion 127 of the moistener column door 125. The upright moistener column 130 supports a plurality of moistener pads 135 configured to remove debris from the spindles 110.

With reference to FIG. 2, a compression structure 140 is coupled to the unit housing 80. The compression structure 140 is configured to exert a pre-load on the moistener column door 125. Alternatively, the compression structure 140 may be adjustable and may exert an adjustable pre-load. Illustratively, the compression structure 140 includes a tension rod 145 and a plurality of springs 150 coupled to the tension rod 145. The springs 150 include a first portion 155 coupled for rotation with the tension rod 145. The springs 150 include a second portion 160 coupleable to the external portion 129 of the moistener column door 125. The tension rod 145 is configured to adjust the pre-load when a torque is applied to the tension rod 145.

Referring to FIG. 4, a latch structure 165 may be coupled to the unit housing 80 to lock the moistener column door 125 in the open position when the cotton plug pressure exceeds a lock set point. Alternatively, the latch structure 165 may be integral with the moistener column door 125 and may be adjusted in ways other than by applying a rotational torque. The latch structure 165 may include an electronic actuator 170 or a pneumatic cylinder (not shown) coupled to the unit housing 80 and the moistener column door 125, enabling an operator or a controller (not shown) to close the moistener column door 125.

In operation, the compression structure 140 is configured to exert a pre-load on the moistener column door 125, placing the moistener column door 125 in a closed position. The compression structure 140 is configured to yield to a cotton plug pressure that exceeds the pre-load, pivoting the moistener column door to an open position. This reduces the opportunity for damage to the row unit 75 because the spindles 110 carrying a cotton plug are able to rotate past the moistener pads 135 without damaging them. When the pre-load exceeds the cotton plug pressure, the compression structure 140 is configured to return the moistener column door 125 to the closed position.

Advantageously, the compression structure 140 may exert a pre-load that is adjustable. The pre-load is adjustable by applying a torque to the tension rod 145, which places a torque on the first portion 155 of the springs 150. This enables the pre-load applied by the plurality of springs 150 to be adjusted in unison. Advantageously, the compression structure 140 may automatically close the moistener column door 125.

Figure 5:
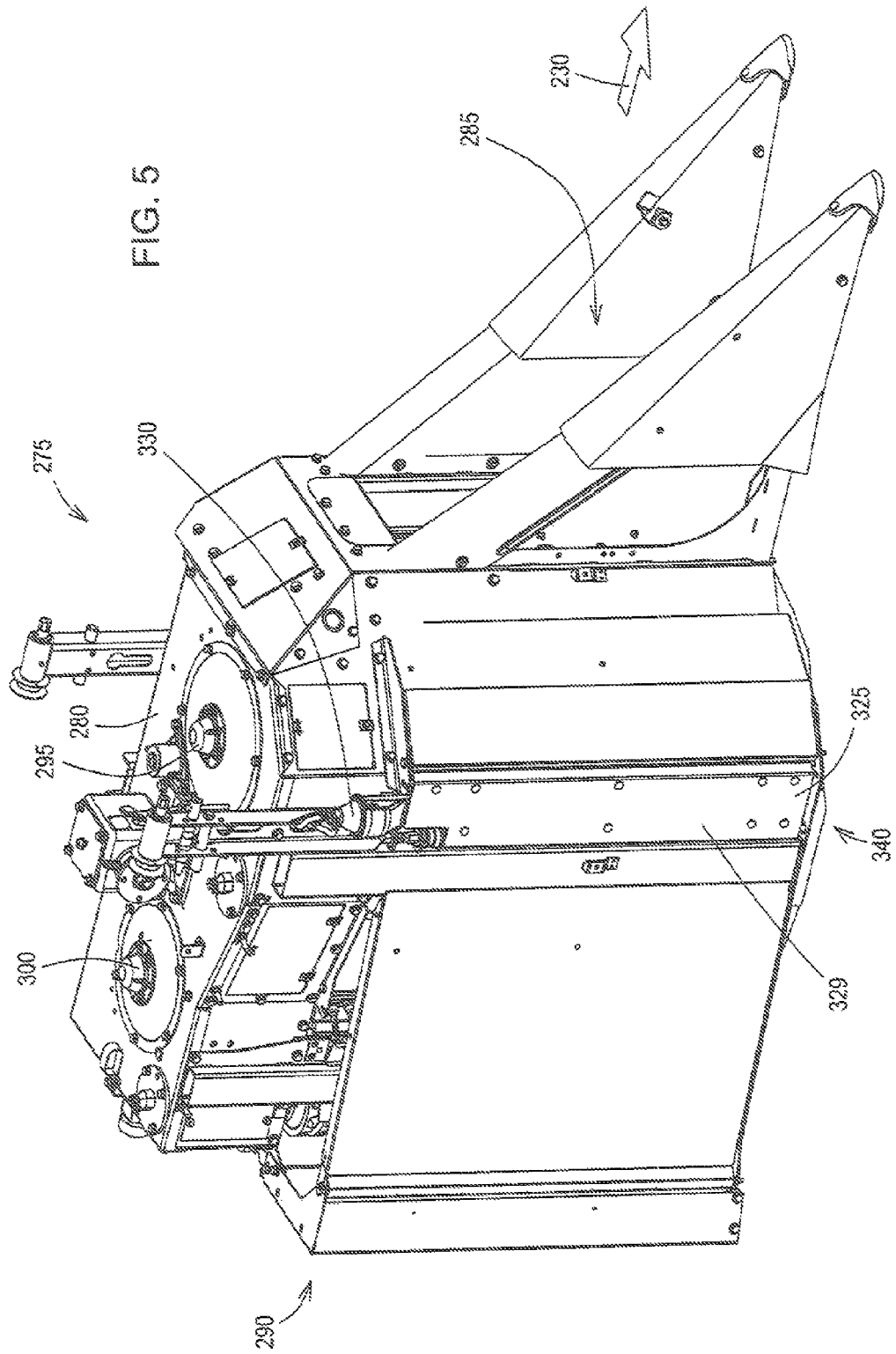
FIG. 5 is a perspective view of a row unit according to another embodiment.
Figure 6:
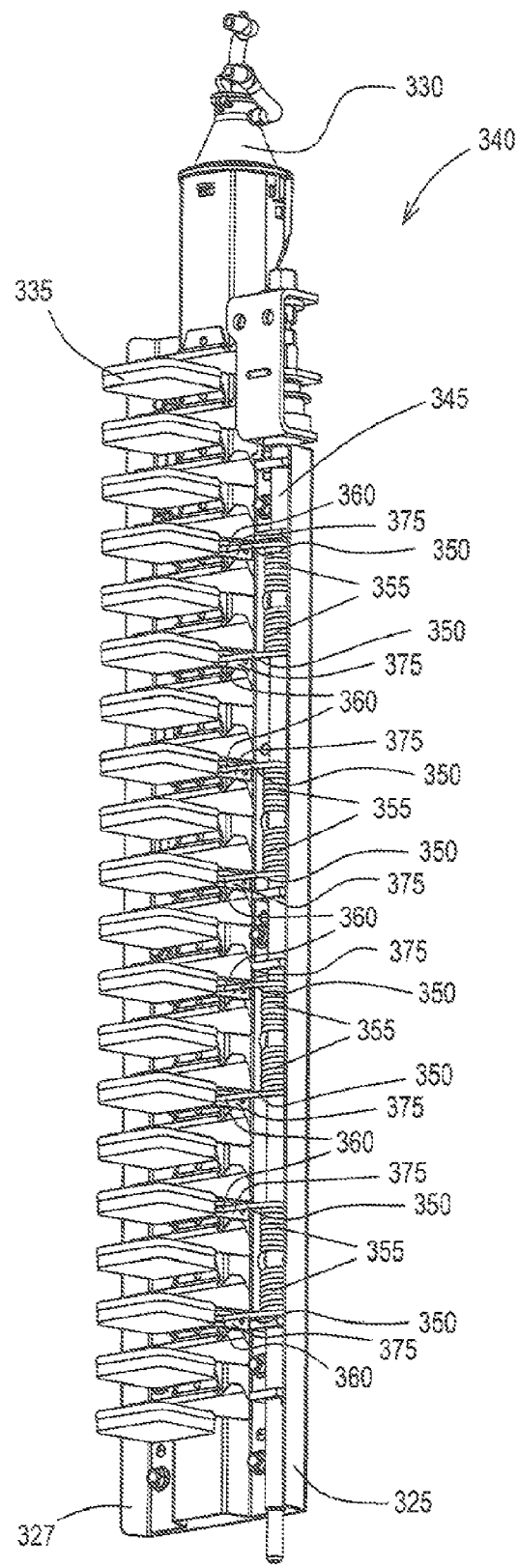
FIG. 6 is a perspective view of a moistener column door of the row unit of FIG. 5.
Figure 7:
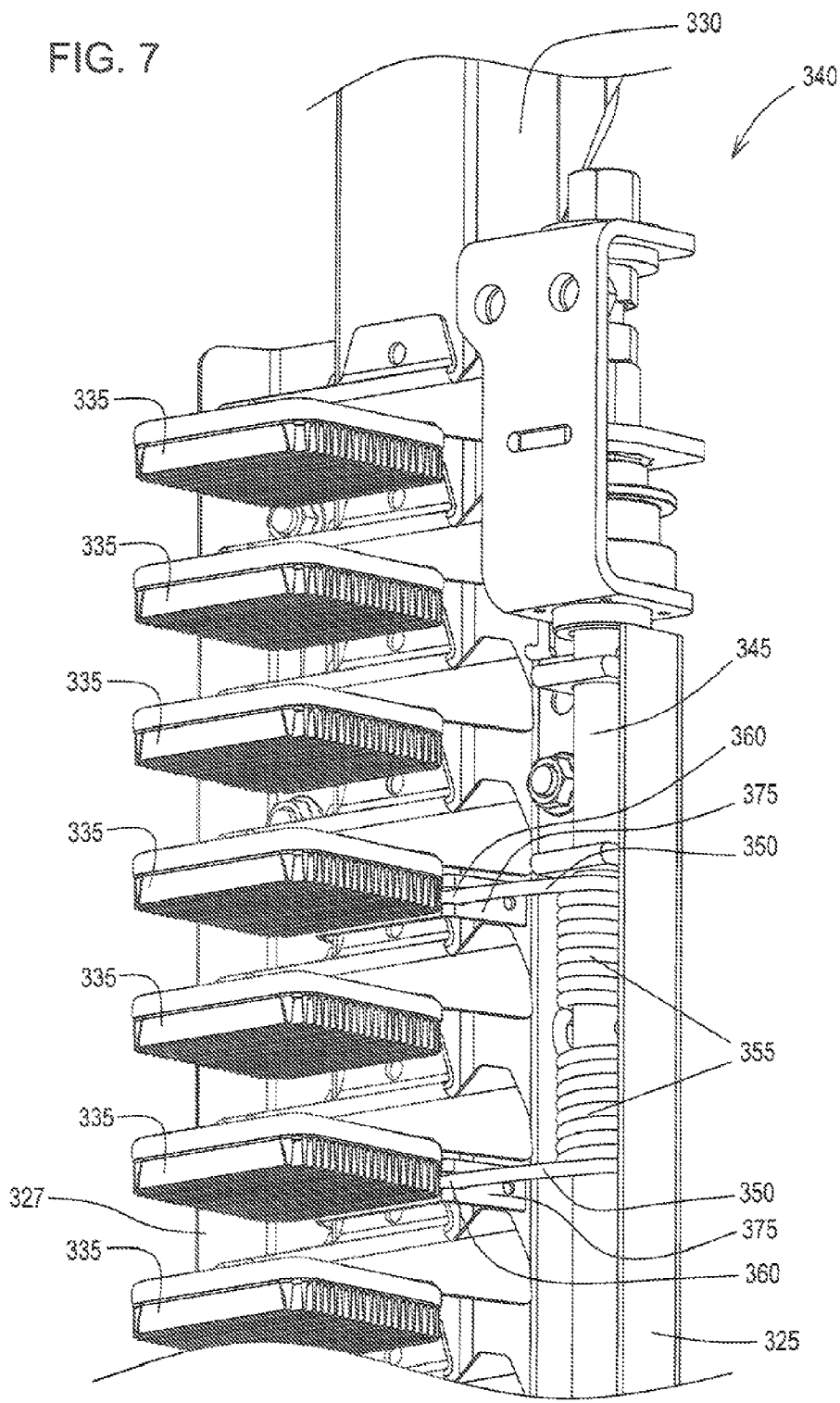
FIG. 7 is a perspective view of a portion of the moistener column door of FIG. 6.

FIGS. 5-7 illustrate a row unit 275 according to another embodiment. The row unit 275 includes features similar to the row unit 75 of FIGS. 1-4, and therefore, like components have been given like reference numbers plus 200 and only differences between the row units 75 and 275 will be discussed in detail below.

Referring to FIGS. 5 and 6, illustratively, a compression structure 340 includes a tension rod 345 and a plurality of springs 350 coupled to the tension rod 345. With reference to FIG. 6, the springs 350 include a first portion 355 coupled for rotation with the tension rod 345. The springs 350 include a second portion 360 coupleable to a retainer 375. Referring to FIG. 7, the retainer 375 is coupleable to a moistener column 330 that is coupleable to an internal portion 327 of a moistener column door 325. The tension rod 345 is configured to adjust the pre-load when a torque is applied to the tension rod 345.

While the disclosure has been illustrated and described in detail in the drawings and foregoing description, such illustration and description is to be considered as exemplary and not restrictive in character, it being understood that illustrative embodiments have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

Various features are set forth in the following claims.

What is claimed is:

1. A row unit for a cotton harvester, which is adapted for forward movement through a field to harvest cotton planted in rows in the field, the row unit comprising:
   a unit housing defining a row receiving area and a cotton exiting area;
   a moistener column door pivotally coupled to the unit housing;
   a latch structure configured to lock the moistener column door in an open position when a cotton plug pressure exceeds a lock set point; and
   a compression structure coupled to the unit housing and configured to exert a pre-load on the moistener column door, placing the moistener column door in a closed position;
   wherein the compression structure is configured to yield to the cotton plug pressure that exceeds the pre-load, pivoting the moistener column door to the open position, and when the pre-load exceeds the cotton plug pressure, the compression structure is configured to return the moistener column door to the closed position from the open position.

2. The row unit of claim 1, wherein the compression structure is an adjustable compression structure configured to exert an adjustable pre-load.

3. The row unit of claim 2, wherein the adjustable compression structure comprises a tension rod and a plurality of springs coupled to the tension rod.

4. The row unit of claim 3, wherein the springs comprise a first portion coupled for rotation with the tension rod and a second portion coupleable to the moistener column door, the tension rod configured to adjust the pre-load when a torque is applied to the tension rod.

5. The row unit of claim 1, further comprising an upright front drum rotatably supported by the unit housing adjacent the row receiving area and an upright rear drum rotatably supported by the unit housing rearwardly of the upright front drum.

6. The row unit of claim 5, further comprising a plurality of spindle bars rotatably supporting a plurality of spindles configured to harvest cotton, the spindle bars coupled for rotation with the upright front drum and the upright rear drum.

7. The row unit of claim 6, further comprising a plurality of upright doffer drums rotatably supporting a plurality of doffer disks configured to remove the cotton from the spindles, the upright doffer drums rotatably supported by the unit housing.

8. The row unit of claim 7, further comprising an upright moistener column supporting a plurality of moistener pads configured to remove debris from the spindles, the upright moistener column is coupled to the moistener column door.

9. A row unit for a cotton harvester that is adapted for forward movement through a field to harvest cotton planted in rows in the field, the row unit comprising:
a unit housing defining a row receiving area and a cotton exiting area;
a moistener column door pivotally coupled to the unit housing;
an adjustable compression structure coupled to the unit housing and configured to exert an adjustable pre-load on the moistener column door, placing the moistener column door in a dosed position; and
a latch structure configured to lock the moistener column door in the open position when the cotton plug pressure exceeds a lock set point;
wherein the adjustable compression structure is configured to yield to a cotton plug pressure that exceeds the adjustable pre-load, pivoting the moistener column door to an open position, and when the adjustable pre-load exceeds the cotton plug pressure, the adjustable compression structure is configured to return the moistener column door to the dosed position from the open position.

10. A cotton harvester that is adapted for forward movement through a field to harvest cotton planted in rows in the field, the cotton harvester comprising:
a chassis; and
a row unit coupleable to the chassis, the row unit comprising a unit housing defining a row receiving area and a cotton exiting area; a moistener column door pivotally coupled to the unit housing; a latch structure configured to lock the moistener column door in an open position when a cotton plug pressure exceeds a lock set point; and a compression structure coupled to the unit housing and configured to exert a pre-load on the moistener column door, placing the moistener column door in a closed position; wherein the compression structure is configured to yield to the cotton plug pressure that exceeds the pre-load, pivoting the moistener column door to the open position, and when the pre-load exceeds the cotton plug pressure, the compression structure is configured to return the moistener column door to the dosed position from the open position.

11. The cotton harvester of claim 10, wherein the compression structure is an adjustable compression structure configured to exert an adjustable pre-load.

12. The cotton harvester of claim 11, wherein the adjustable compression structure comprises a tension rod and a plurality of springs coupled to the tension rod.

13. The cotton harvester of claim 12, wherein the springs comprise a first portion coupled for rotation with the tension rod and a second portion coupleable to the moistener column door, the tension rod configured to adjust the pre-load when a torque is applied to the tension rod.

14. The cotton harvester of claim 10, further comprising an upright front drum rotatably supported by the unit housing adjacent the row receiving area and an upright rear drum rotatably supported by the unit housing rearwardly of the upright front drum.

15. The cotton harvester of claim 14, further comprising a plurality of spindle bars rotatably supporting a plurality of spindles configured to harvest cotton, the spindle bars coupled for rotation with the upright front drum and the upright rear drum.

16. The cotton harvester of claim 15, further comprising a plurality of upright doffer drums rotatably supporting a plurality of doffer disks configured to remove the cotton from the spindles, the upright doffer drums rotatably supported by the unit housing.

17. The cotton harvester of claim 16, further comprising an upright moistener column supporting a plurality of moistener pads configured to remove debris from the spindles, the upright moistener column is coupled to the moistener column door.

* * * * *